US 9,878,641 B2

(12) United States Patent
Gallienne et al.

(10) Patent No.: US 9,878,641 B2
(45) Date of Patent: Jan. 30, 2018

(54) ANGULAR ADJUSTMENT DEVICE FOR A VEHICLE SEAT (71) Applicant: Faurecia Sièges d'Automobile, Nanterre (FR)

(72) Inventors: Didier Gallienne, Landigou (FR); Damien Grimaud, Caligny (FR)

(73) Assignee: Faurecia Sièges d'Automobile, Nanterre (FR)

( * ) Notice: Subject to any disclaimer, the term of this patent is extended or adjusted under 35 U.S.C. 154(b) by 81 days.

(21) Appl. No.: 14/805,771

(22) Filed: Jul. 22, 2015

(65) Prior Publication Data
US 2016/0023575 A1    Jan. 28, 2016

(30) Foreign Application Priority Data

Jul. 22, 2014  (FR) ...................... 14 57065

(51) Int. Cl.
| B60N 2/22 | (2006.01) |
| B60N 2/20 | (2006.01) |
| B60N 2/235 | (2006.01) |

(52) U.S. Cl.
CPC .............. B60N 2/224 (2013.01); B60N 2/20 (2013.01); B60N 2/2356 (2013.01); B60N 2205/50 (2013.01)

(58) Field of Classification Search
CPC ........ B60N 2/224; B60N 2/20; B60N 2/2356; B60N 2205/50
USPC ............................................. 297/367 P, 367 L
See application file for complete search history.

(56) References Cited

U.S. PATENT DOCUMENTS

| 6,007,153 | A * | 12/1999 | Benoit | B60N 2/2358 297/363 |
| 7,168,764 | B2 * | 1/2007 | Reubeuze | B60N 2/236 297/367 R |
| 7,744,157 | B2 * | 6/2010 | Ishihara | B60N 2/2356 297/367 P |
| 7,784,872 | B2 * | 8/2010 | Kienke | B60N 2/2356 297/367 P |
| 7,823,978 | B2 * | 11/2010 | Ishihara | B60N 2/20 297/367 L |
| 7,922,250 | B2 * | 4/2011 | Rohee | B60N 2/20 297/367 L |
| 8,042,872 | B2 * | 10/2011 | Kim | B60N 2/2356 297/367 L |

(Continued)

FOREIGN PATENT DOCUMENTS

| FR | 2977205 A1 | 1/2013 |
| JP | 2007144131 A | 6/2007 |

(Continued)

OTHER PUBLICATIONS

FR Search Report for application No. FR1457065 dated Mar. 19, 2015, 2 pages.

*Primary Examiner* — Philip F Gabler
(74) *Attorney, Agent, or Firm* — Reising Ethington P.C.

(57) ABSTRACT

A hinge mechanism for a motor vehicle seat allowing angular adjustment of a backrest relative to a seating portion. The hinge mechanism includes first and second hinge plates, a control member moving locking elements and biased to a locking position by first springs, and a drive shaft biased to a first rest position by second springs. The second springs are housed between the first and second hinge plates and are supported on the first plate.

20 Claims, 6 Drawing Sheets

(56) References Cited

U.S. PATENT DOCUMENTS

| | | | | |
|---|---|---|---|---|
| 8,201,888 B2* | 6/2012 | Fassbender | .......... | B60N 2/2356 297/367 L |
| 8,251,451 B2* | 8/2012 | Dziedzic | .............. | B60N 2/2356 297/366 |
| 8,430,454 B2* | 4/2013 | Tanguy | ................ | B60N 2/2356 297/367 L |
| 8,459,743 B2* | 6/2013 | Villarroel | ............. | B60N 2/2356 297/367 L |
| 8,523,281 B2* | 9/2013 | Wahls | .................. | B60N 2/2356 297/367 L |
| 8,585,149 B2* | 11/2013 | Villarroel | ................. | B60N 2/20 297/367 L |
| 8,616,648 B2* | 12/2013 | Holzhueter | .......... | B60N 2/2356 297/366 |
| 8,641,145 B2* | 2/2014 | Schwarze | ............ | B60N 2/206 297/366 |
| 8,641,146 B2* | 2/2014 | Suzuki | ................ | B60N 2/2356 297/367 P |
| 8,864,234 B2* | 10/2014 | McCulloch | .......... | B60N 2/2358 297/367 P |
| 8,876,212 B2* | 11/2014 | Yamada | ................... | B60N 2/02 297/367 P |
| 8,960,797 B2* | 2/2015 | Fassbender | .......... | B60N 2/2356 297/367 L |
| 8,985,689 B2* | 3/2015 | McCulloch | .......... | B60N 2/2356 297/367 P |
| 9,272,649 B2* | 3/2016 | Gallienne | ............ | B60N 2/4435 |
| 2013/0001997 A1 | 1/2013 | Gallienne et al. | | |

FOREIGN PATENT DOCUMENTS

| | | |
|---|---|---|
| WO | 2012174644 A1 | 12/2012 |
| WO | WO2012/174644 * | 12/2012 |

* cited by examiner

ANGULAR ADJUSTMENT DEVICE FOR A VEHICLE SEAT

TECHNICAL FIELD

The present invention relates to hinge mechanisms and angular adjustment devices for a vehicle seat, and relates in particular to seatback hinges with stepwise adjustment.

BACKGROUND

Such a seat hinge mechanism is known from document FR2977205. However, in such a device, the spring which advantageously biases the drive shaft against an abutment, at a distance from the locking positions of the control cams in the hinge mechanisms, is external to the hinge mechanism itself.

The present invention is intended to improve seat hinge mechanisms, to render them more compact and more easily integrated while providing appropriate safety features and an impression of quality.

SUMMARY

More specifically, the invention relates to a hinge mechanism for a motor vehicle seat, allowing angular adjustment of a first frame member relative to a second frame member about a main hinge axis, comprising:

a first hinge plate and second hinge plate, intended to be rigidly connected to the first frame member and the second frame member respectively,    a control member, able to move locking elements which are adapted to immobilize the first hinge plate rotationally relative to the second hinge plate, and biased to a locking position by at least one first spring,    a drive shaft, biased to a rest position by at least one second spring,    in particular the drive shaft is decoupled from the control member and adapted to move the control member rotationally about the main axis,    in addition, the drive shaft has an outer shaft on which a handle is mounted,    furthermore, the drive shaft abuts against a stop of the first frame member in the first rest position.

To this end, at least some embodiments of the invention provide a seat hinge mechanism characterized in that the second spring is housed between the first and second hinge plates, i.e. in the inside space of the hinge mechanism and the second spring bears against the first plate (also called 'fixed' plate).

This reduces the axial dimensions of the hinge mechanism and the biasing components of the drive shaft, which facilitates integration of such a mechanism within the hinge area of the seat between the backrest and the seating portion.

Advantageously, one will note that the biasing of the drive shaft is achieved independently of the biasing of the control member, which ensures that the hinge mechanism is properly relocked when no stresses are applied on the handle.

In various embodiments of the invention, one or more of the following arrangements may possibly be used.

The first spring(s) and second spring(s) are arranged substantially at the same axial position, so that the axial thickness of such a hinge mechanism equipped with such second spring(s) is not thicker than the actual hinge mechanism of the prior art.

The hinge mechanism may comprise at least two first springs, the second spring being arranged circumferentially at midpoint between two first springs. The housing of the first and second springs thus alternates in a balanced and circumferentially distributed manner.

There may be three first springs and three second springs respectively interposed between two first springs, each of the first springs and second springs being separated by an angular distance that is substantially near 60°. One can thus have six return springs, independently biasing both the control member and the drive shaft, in particular in six identical housings or recesses arranged on a disc.

The locking elements are guided in translation in the radial direction, under the effect of rotation of the control member, by guides. In addition, the guides are arranged circumferentially between the recesses for the springs, which optimizes the axial compactness of the first frame.

Backlash is provided between the first rest position of the drive shaft and the drive position of the drive shaft, allowing dead travel of more than 3°. This ensures that the locking cam is properly in the locking position securing the locking elements. In addition, unwanted small-scale movement of the drive shaft will not result in an undesired release of the hinge mechanism.

Each of the second springs is formed as a flat coil spring, which is an easy solution to manufacture. In addition, advantageously the second springs can be substantially identical to the first springs, which is advantageous in terms of reduced industrial diversity.

The drive shaft may include an internal hub and/or a connecting rod.

Advantageously, the internal hub comprises at least one radial projection which supports the second spring biasing the drive shaft toward the first rest position. This provides a simple solution for returning the shaft to the rest position and also optimizes the choice of materials for the component parts of the drive shaft.

An external shaft may be snap-fitted onto the internal hub. In addition, the connecting rod may be snap-fitted into the external shaft, which provides axial retention of the connecting rod. The mechanism can thus be assembled manually, without tools.

The external shaft may preferably abut against an abutment of the first frame member. A handle is mounted on the external shaft. This provides a clearly defined stop, which further reinforces the quality perceived by the user.

The external shaft comprises three radial projections, at about 120° intervals, which press against three corresponding stops of the frame, whereby the forces on the stop are balanced with respect to the shaft/axis, ensuring robustness in case of significant force on the handle in the direction opposite that of normal operation.

The control member comprises a control cam adapted to push the locking elements outwardly into the locked position and a control plate comprising at least one ramp adapted to move the locking elements inwardly into the unlocked position, whereby the choice of materials can be optimized, for example a metal cam and a plastic control plate, as can the weight of the control member.

The invention also relates to an angular adjustment device for a vehicle seat, comprising a first hinge mechanism as described above, the control member of the first hinge mechanism forming a first control member, the adjustment device further comprising a second hinge mechanism comprising:

third and fourth hinge plates intended to be rigidly connected to the first and second frame members respectively, a second control member able to move second locking elements which are adapted to immobilize the third hinge plate relative to the fourth hinge plate, the drive shaft being adapted to rotate the second control member about the main axis, wherein the second control member is returned to a locking position by at least a third spring, the first rest position of the drive shaft being separated from the position where the drive shaft stresses (drives) the second control member from its locking position by a second backlash; such that each of the two hinge mechanisms is driven by the drive shaft after a certain angular dead travel.

In particular, the first frame member may be part of a seating portion and the second frame member may be part of a backrest of the seat.

The invention also relates to a vehicle seat comprising a seating portion, a backrest, and at least one hinge mechanism as described above or an angular adjustment device as defined above.

Of course, the different features, variants, and/or embodiments of the invention may be combined in various combinations to the extent that they are not incompatible or mutually exclusive of one another.

BRIEF DESCRIPTION OF THE DRAWINGS

The invention will be better understood and other characteristics and advantages will become apparent upon reading the following detailed description of some embodiments provided for illustrative purposes with reference to the accompanying figures, given by way of non-limiting examples, which may serve to supplement an understanding of the invention and the description of its implementation and, where appropriate, contribute to its definition, in which.

It should be noted that the structural and/or functional elements common to the various embodiments in the figures may have the same references. Unless otherwise stated, such elements can have identical structural, dimensional, and material properties.

DETAILED DESCRIPTION OF THE ILLUSTRATED EMBODIMENTS

For clarity, only those elements useful to understanding the described embodiments are represented and will be detailed.

In the following description, when using absolute position qualifiers such as the terms 'front', 'rear', 'top', 'bottom', 'left', 'right', etc., or relative ones such as the terms 'above', 'below', 'upper', 'lower', etc., or orientation qualifiers, these are relative to a seat in a normal usage position and with the usual direction of movement of the vehicle.

Figure 1:
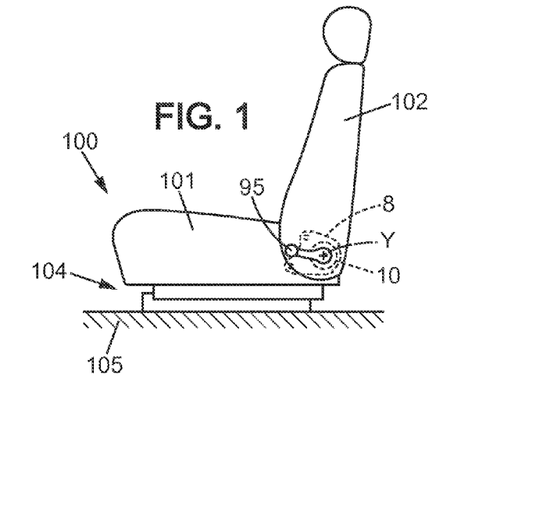
FIG. 1 is a general view of a vehicle seat equipped with a hinge mechanism according to the invention.

FIG. 1 is a general view of a seat 100, in particular a motor vehicle seat 100, equipped with a hinge mechanism 10 according to the invention. More specifically, FIG. 1 shows a seat 100 comprising a backrest 102 mounted on a seating portion 101 so as to pivot about a pivot axis Y, or hinge axis Y, preferably a horizontal transverse pivot axis Y. In addition, the seating portion 101 is mounted on a floor 105, in particular a floor 105 of the vehicle, by means of longitudinal rails 104 where appropriate.

In addition, a control handle 95 is provided to allow a user to adjust the angular position of the backrest 102 relative to the seating portion 101, and more generally of a first element of the seat 100 relative to a second element of the seat 100.

Figure 2:
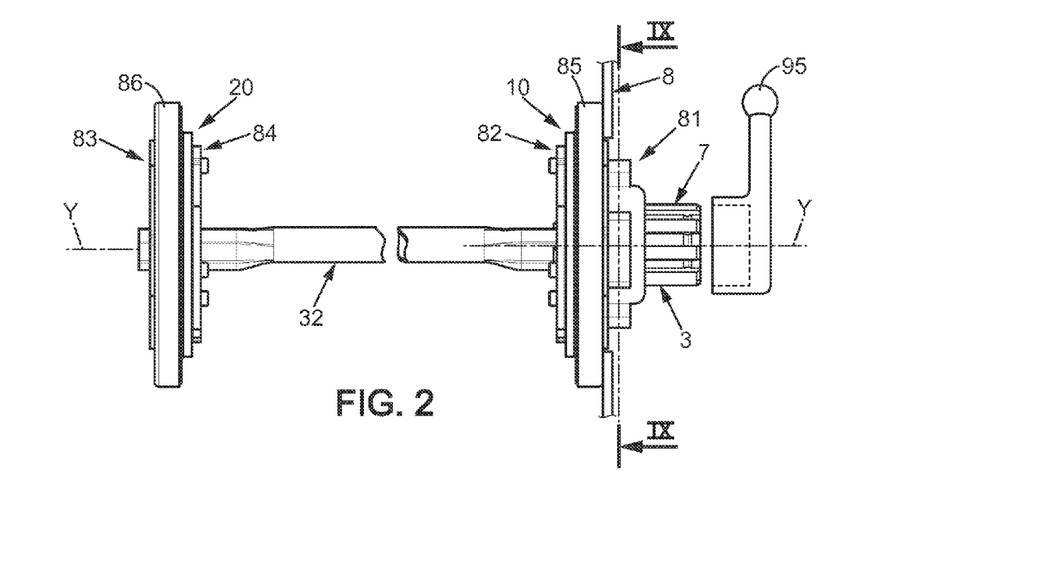
FIG. 2 is a front view of an angular adjustment device used in the seat of FIG. 1 with two hinge mechanisms according to the invention.

FIG. 2 is a front view of an angular adjustment device used in the seat 100 of FIG. 1. Pivoting of the backrest 102 is made possible by the angular adjustment device shown in FIG. 2, comprising at least the first hinge mechanism 10, arranged for example on the left side of the seat 100.

According to the embodiment shown, the angular adjustment device comprises a second hinge mechanism 20, which is optional according to the invention, arranged for example on the right side of the seat 100. Preferably, the first hinge mechanism 10 and second hinge mechanism 20 are actuated synchronously by the control handle 95, advantageously located on the left side, or by any other actuator, for example an 'Easy Entry' seat control allowing access to the back seats of a two-door vehicle.

The first hinge mechanism 10 and second hinge mechanism 20 are adapted to prevent (or lock) the pivoting of the backrest 102 relative to the seating portion 101 during normal usage. In addition, the first hinge mechanism 10 and second hinge mechanism 20 are also adapted to allow rotational movement of the backrest 102 relative to the seating portion 101 when the user applies force to the control handle 95.

It should be noted that the first hinge mechanism 10, and if appropriate the second hinge mechanism 20, can be used to connect any element of the seat 100 to another part of the seat 100 and not necessarily the seating portion 101 and backrest 102.

Figure 3:
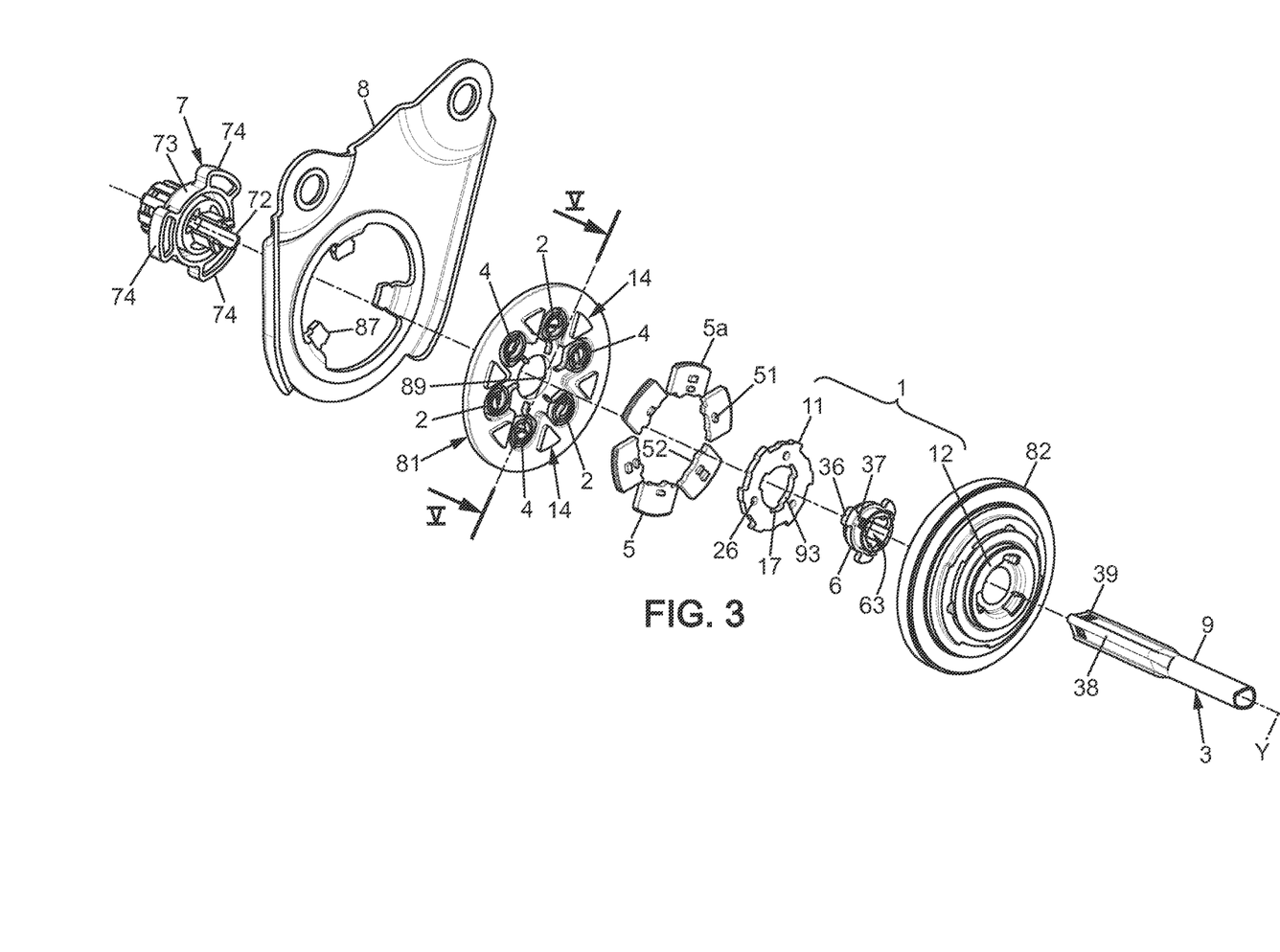
FIG. 3 shows an exploded perspective view of the hinge mechanism of the angular adjustment device of FIG. 2.
Figure 4:
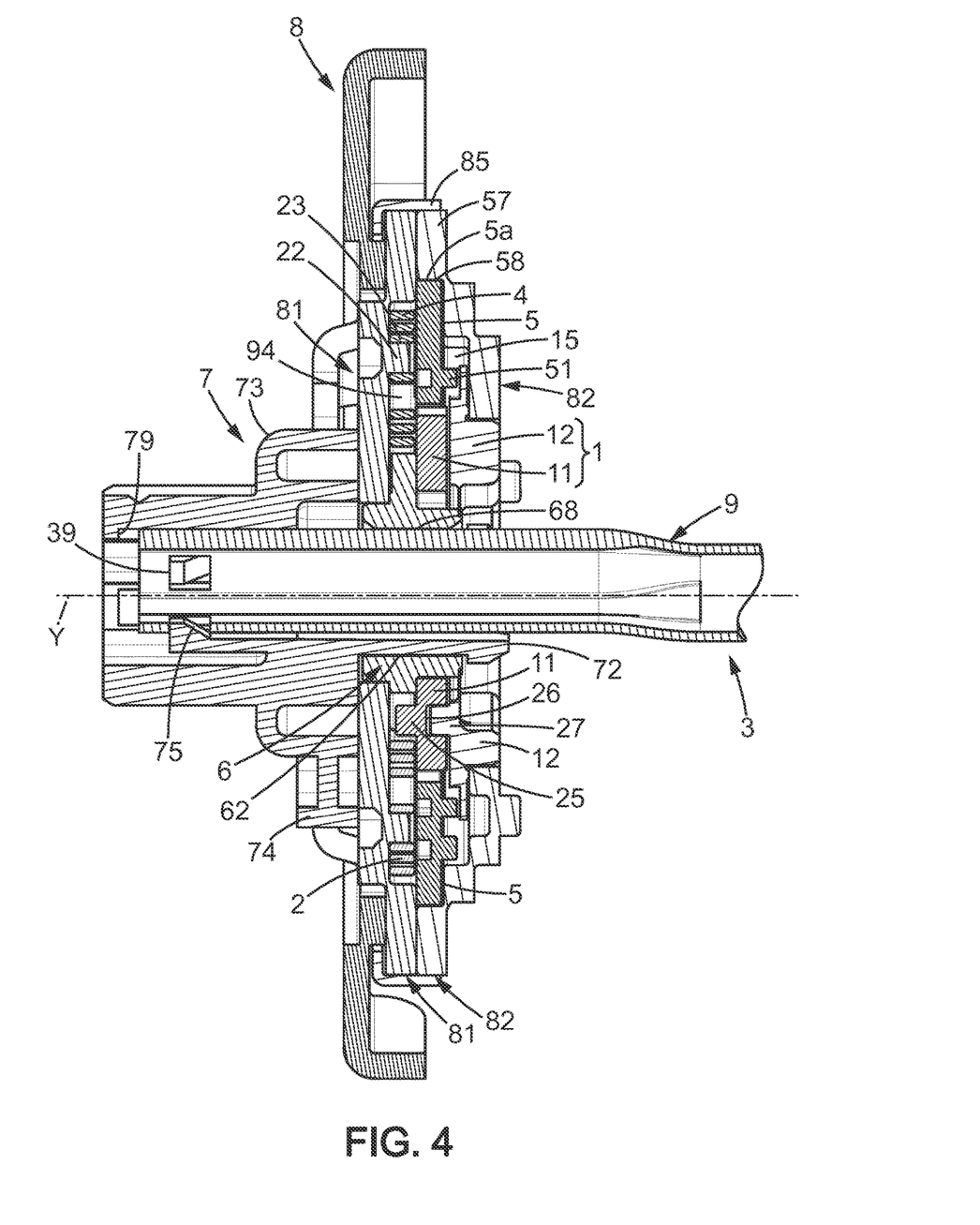
FIG. 4 is an axial sectional view of the hinge mechanism of FIG. 3.

As shown in FIGS. 2 to 10, and particularly in FIGS. 3 and 4 which respectively represent an exploded perspective view and an axial sectional view of the hinge mechanism 10 of the angular adjustment device of FIG. 2, the first hinge mechanism 10 firstly comprises a first hinge plate 81 and second hinge plate 82, in particular of metal, respectively attached to a seating frame 8 and to the backrest frame (not shown). The first plate 81 and second plate 82 may be substantially circular in shape and connected together by an outer ring 85, preferably crimped and advantageously of metal, thereby defining an interior space which contains a locking device.

The locking device comprises at least one locking element 5, preferably a plurality of locking elements 5, each equipped with external teeth 5a. The locking element 5 may also comprise a guide pin 51.

The second plate 82 comprises a peripheral annular region 57. Advantageously, the peripheral annular region 57 of the second plate 82 has a toothed surface 58 oriented radially inward. The toothed surface 58 faces the external teeth 5a of the locking member 5.

Figure 5:
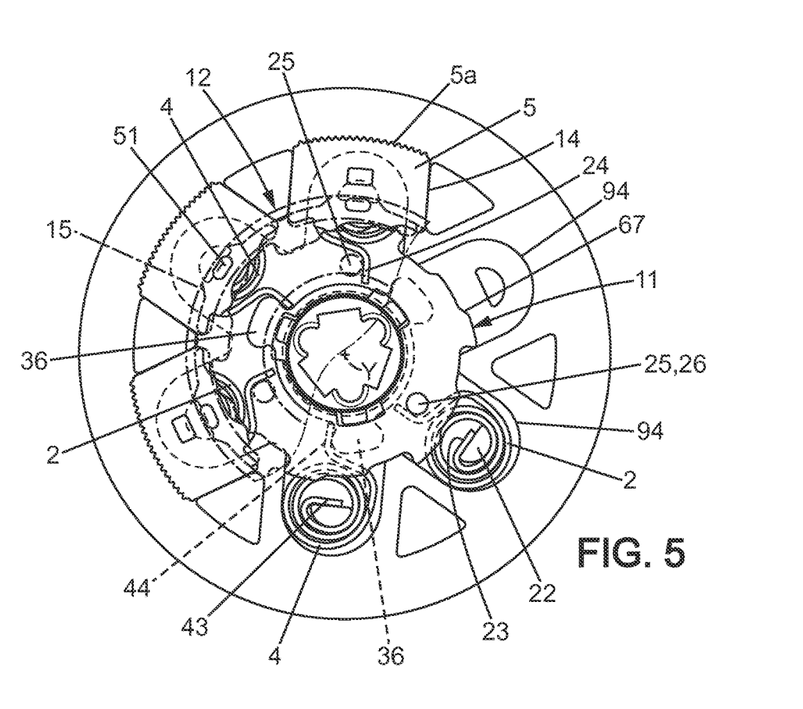
FIG. 5 is a cross-sectional view of the hinge mechanism in locked position, along section line VV of FIG. 3.
Figure 6:
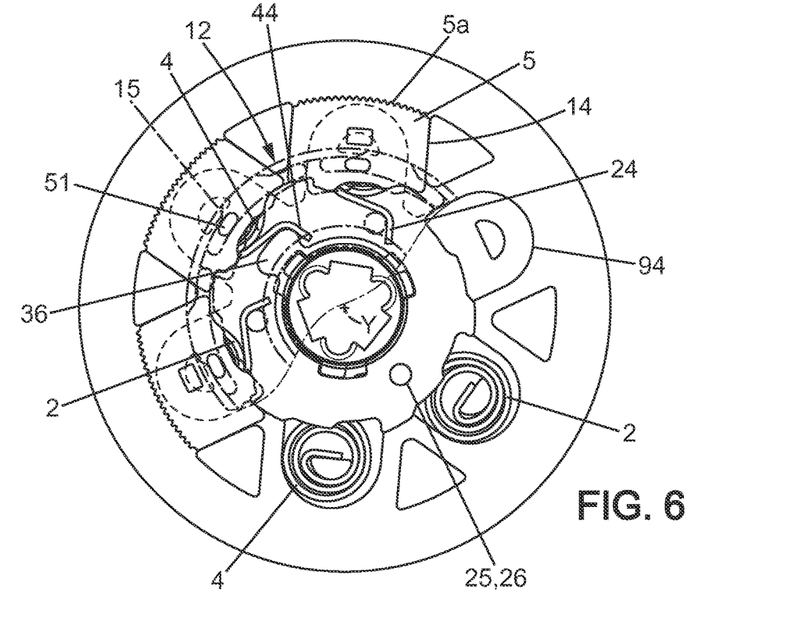
FIG. 6 is a cross-sectional view of the hinge mechanism in the unlocked position, along section line VV of FIG. 3.

We will now refer more particularly to FIGS. 5 and 6 which are the same cross-sectional view along section line VV of FIG. 3, with the hinge mechanism 10 respectively in the locked position and the unlocked position.

The locking element 5 is radially movable, within guides 14 which are part of the first plate 81, between
- a locked position, shown in FIG. 5, where the external teeth 5a of the locking element 5 engage with the toothed surface 58 of the annular peripheral region 57 of the second plate 82, and
- an unlocked position, shown in FIG. 6, where the locking element 5 is moved radially inward so that the external teeth 5a do not engage with the toothed surface 58 of the peripheral annular region 57 of the second plate 82, thereby freeing the second plate 82 to rotate freely relative to the first plate 81.

The first hinge mechanism 10 comprises a control member 1 mounted so as to pivot about the hinge axis Y. The control member 1 is adapted to move the locking element 5 (or the locking elements when there several) between the locked position and the unlocked position.

The control member 1 comprises a control plate 12, or control cover plate 12, and a control cam 11. The control member 1 is resiliently biased by at least one first spring 2, preferably a plurality of first springs 2, toward a locking position where the control cam 11 pushes the locking element 5 radially outward into the locked position, as shown in FIG. 5.

Figure 9:
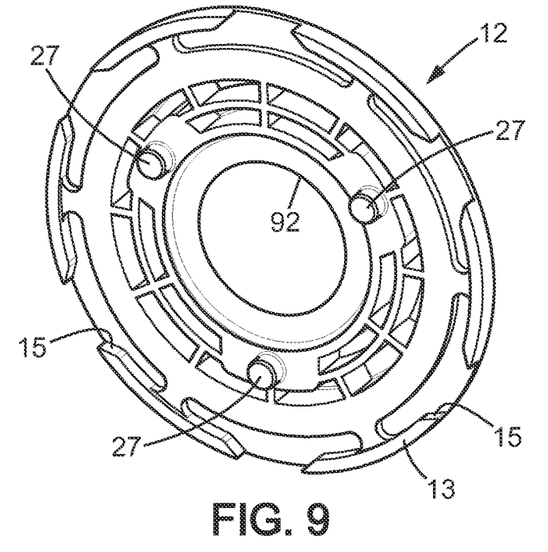
FIG. 9 is a detail view showing a cover plate of a control member according to the invention.
Figure 10:
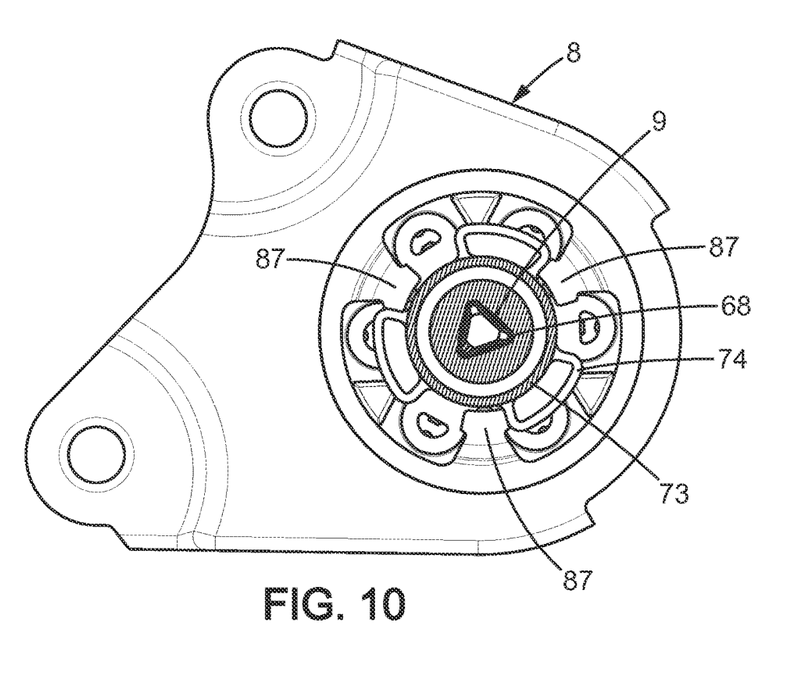
FIG. 10 is a partial cross-sectional view of the hinge mechanism as viewed from the outside along section line IX-IX of FIG. 2.

FIG. 9 is a detail view showing the control plate 12, or control cover plate 12, of the control member 1 of the invention.

In the non-limiting example shown, the hinge mechanism 10 comprises three first springs 2. However, it is possible to have two or one. Similarly, it is possible for the hinge mechanism 10 to comprise more than three first springs 2.

Preferably, the first spring 2 is a coil spring and comprises: a first end 23 forming an anchor on a pin 22, in particular semi-circular, of the first plate 81; and a second end 24 in sliding contact with a pin 25 of the control cam 11.

In addition, the first spring 2 is arranged in a housing 94, in particular an individual recess 94. In the example illustrated, the housing 94 is interposed between two guides 14 for the locking element 5. Advantageously, the housing 94 is formed in the first plate 81. In the example shown, six housings 94 are formed around a central hole 89 of the first plate 81.

The control member 1 can be rotated into an unlocked position by actuation of the control handle 95, as shown in FIG. 6, where the control plate 12 causes the locking element 5 to move, preferably radially inwards, to an unlocked position.

The control plate 12 is in the form of a disk having a central axial opening 92, at least one connecting pin 27, advantageously a plurality of connecting pins 27, and at least one peripheral edge 13, preferably a plurality of peripheral edges 13, which are particularly visible in FIG. 9.

Advantageously, the peripheral edge 13 comprises at least one ramp 15, adapted to cooperate via camming action with the guide pin 51 of the locking element 5.

The control plate 12 is made of plastic. Alternatively, the control plate 12 may be made of metal, however.

The control cam 11, which may be in the form of a thick metal disc, extends perpendicularly to the hinge axis Y. The control cam 11 comprises a central recess 93 defining an inner edge with at least one notch 17, specifically three notches 17 in the embodiment shown, provided for rotationally driving the cam 11 and thus also the control member 1.

In addition, the cam 11 may comprise at least one inclined face 67, specifically six inclined faces 67 in the embodiment shown, forming a driving member on a peripheral region of the control cam 11.

Furthermore, the cam 11 may incorporate at least one recess 26, specifically three recesses 26 according to the embodiment shown, preferably blind recesses, provided for receiving the connecting pin 27 of the control cover plate 12.

Lastly, the cam 11 may also comprise the pin 25 formed by a stamped shape with corresponding recess 26, against which the second end 24 of the first spring 2 bears.

More particularly, each inclined face 67 is adapted to push the locking element 5 outward, by pressing against at least one thrust bearing surface 52.

The cam 11 and the control plate 12 are thus held together to form the control member 1.

The first hinge mechanism 10 further comprises a drive shaft 3 adapted to rotate the control member 1, in particular when the user applies force to the control handle 95.

The drive shaft 3 is decoupled from the control member 1.

Figure 7:
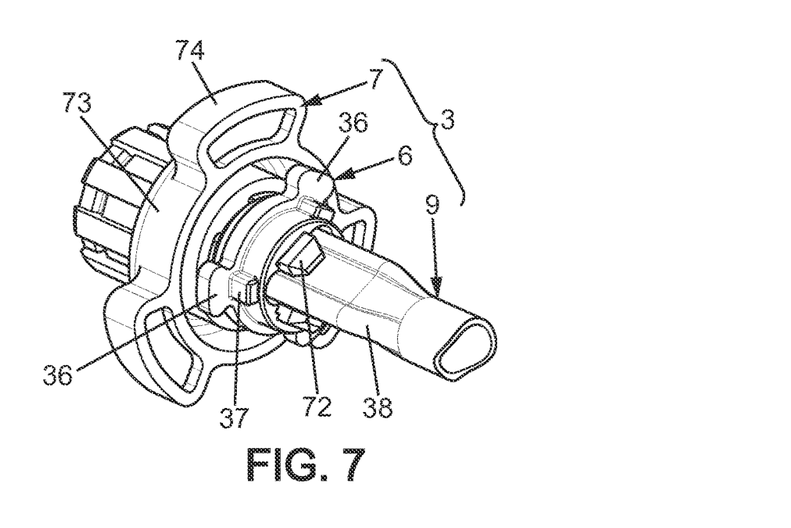
FIG. 7 is a partial perspective view of a drive shaft according to the invention.

FIG. 7 is a partial perspective view of the drive shaft 3 of the invention. More particularly, the drive shaft 3 comprises:
- a control hub 6, in particular obtained by molding plastic material,
- an optional connecting rod 9, preferably metal and advantageously adapted to connect the first hinge mechanism 10 and second hinge mechanism 20, as will be described below, and
- an external shaft 7, in particular obtained by molding plastic material, on which the control handle 95 is mounted.

Once assembled, the control hub 6, the connecting rod 9, and the external shaft 7 form an integral whole that defines the drive shaft 3. However, there preferably remains an angular degree of freedom about Y relative to the control member 1.

The control hub 6 comprises at least one lobe 36, specifically three lobes 36 in the embodiment shown, projecting radially outward. The lobe 36 serves as support for a biasing function described below.

In addition, the control hub 6 comprises at least one projection 37 or wall segment 37, specifically three projections 37 according to the embodiment shown, projecting radially outward. The projection 37 comprises a first edge 37b, called the 'front', and an opposite second edge 37a, the 'back'. The projection 37 allows the drive shaft 3 to drive the control member 1, as will be described below, particularly by cooperation of the first edge 37b of the wall segment 37 with the facing edge 17b of the notch 17 in the cam 11.

The control hub 6 also comprises an axial recess 63. According to a particular embodiment, the axial recess 63 comprises concave housings 68 and rectangular housings 62, whose usefulness will be described below.

Figure 8:
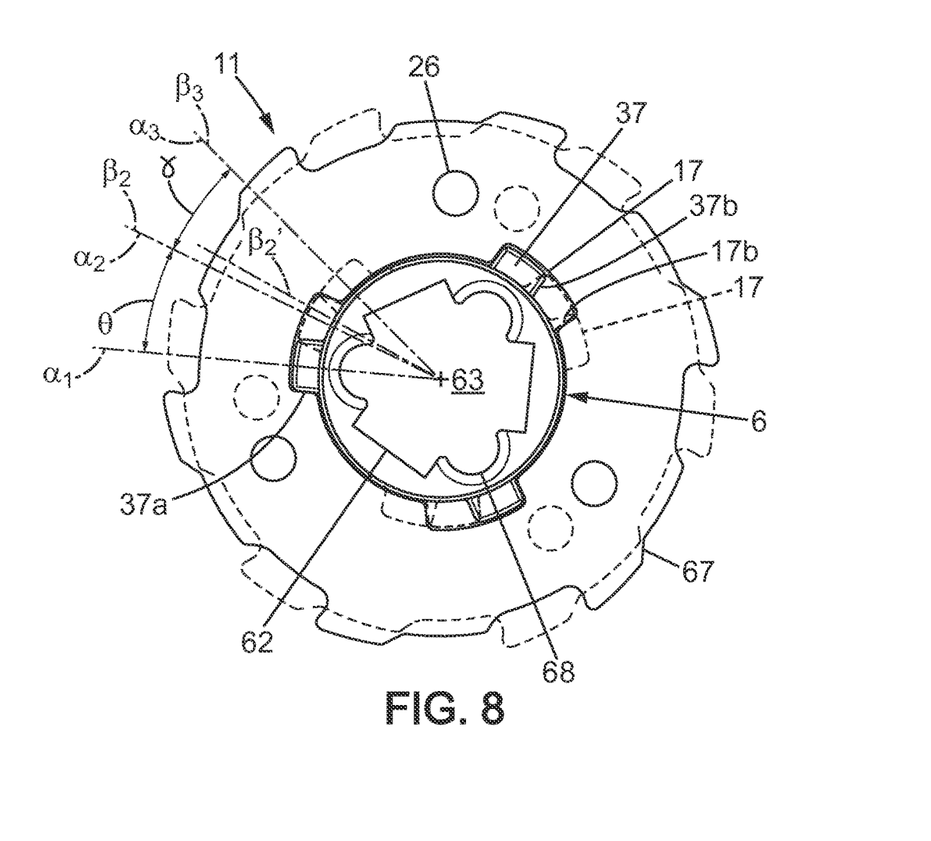
FIG. 8 illustrates different positions of a control cam and of the drive shaft according to the invention.

The drive shaft 3 is biased toward a rest position α1, as represented in particular in FIGS. 5 and 8, by at least one second spring 4.

In the embodiment shown, there are three second springs 4. However, there may be two or one, depending on the return torque that is desired on the drive shaft 3, in other words the rotational "difficulty" of the control.

Preferably, the second spring 4 is a coil spring and comprises: a first end 43 forming an anchor on a pin 22, in particular semi-circular, of the first plate 81; and a second end 44 in sliding contact with the lobe 36 of the control hub 6.

In addition, the second spring 4 is housed in the housing 94, as defined above, in particular the individual recess 94. Advantageously, the first spring 2 and the second spring 4 are identical and are identically mounted in their respective housing 94.

The connecting rod 9 is preferably made of metal and optionally connects the first hinge mechanism 10 to the second hinge mechanism 20 located on the side of the seat 100 opposite that of the first hinge mechanism 10.

It is noted that, although this case is not shown in the figures, a single hinge mechanism 10 can be used to implement the invention, and in this case the connecting rod 9 is reduced to a simple sleeve mounted on the control hub 6, in particular by crimping, in particular on a splined portion of the control hub 6.

Advantageously, as shown, the connecting rod 9 connects the first hinge mechanism 10 to the second hinge mechanism 20 and comprises a cylindrical tube centered on the pivot axis Y having ends comprising at least one lobe 38 to be housed in the concave housing 68 of the internal hub 6. In the illustrated example, three lobes 38 are each received in one of three concave housings 68.

The external shaft 7 of the drive shaft 3 has an annular portion 73, preferably cylindrical, from which extends at least one locking lobe 74, specifically three locking lobes 74 in the embodiment presented, provided to cooperate with at least one stop tab 87 arranged on the seating frame 8, preferably radially. The external shaft 7 also comprises at least one fastening tab 72, preferably flexible, extending in the axial direction, specifically three fastening tabs 72 in the embodiment shown. Preferably, the fastening tab 72 snap-fits into the rectangular housings 62 of the control hub 6 as shown in FIG. 7.

In addition, the angular adjustment device according to the invention may comprise, as already mentioned, a second hinge mechanism 20, advantageously a mirror image of the first hinge mechanism 10 relative to the pivot axis Y, located on the opposite side of the seat relative to the first hinge mechanism 10. The second hinge mechanism 20 is similar or identical to the first hinge mechanism 10, except for certain aspects that are detailed below.

The second hinge mechanism 20 comprises:
- a third plate 83 and a fourth plate 84 which are similar to the first and second plates 81,82 and are respectively fixed to the frame of the seating portion and the frame of the backrest, these frames being respectively rigid with or integral with the seating and backrest frame already mentioned, with a crimped peripheral ring 86,
- a second control member, comprising a control plate similar to the control plate 12 of the first hinge mechanism 10 and a cam similar to the control cam 11 of the first hinge mechanism 10,
- second locking elements similar to the locking elements 5 of the first hinge mechanism 10,
- at least one third return spring similar to the first spring 2 of the first hinge mechanism 10, intended to bias the second control member toward the locking position, and
- an internal hub identical or similar to the one previously described.

The internal operation of the second hinge mechanism 20 is similar to that of the first hinge mechanism 10 and will not be described again in detail.

The operation of the angular adjustment device will now be described with reference to the figures, particularly FIG. 8. For this purpose:

the angular positions α1, α2, α3 denote positions of the drive shaft 3,
the angular positions β2, β3 denote positions of the control member 1 of the first hinge mechanism 10, and
the angular position β2' denotes a locked position of the control member of the second hinge mechanism 20.

At rest, the drive shaft 3 is in the angular position α1, also called the rest position α1, resulting from an absence of action on the control member 1. The rest position α1 can also be ensured by the presence of backlash θ (otherwise called 'clearance') or dead travel θ. In the example, the rest position α1 was chosen by convention as a direction from the middle of projection 37, as shown in FIG. 8.

The circumferential length of the notches 17 can be sized so that the rear edge 37a of the wall segment 37 comes substantially near or in contact with the circumferential edge of the notch 17.

When the user actuates the control handle 95, in the clockwise direction in the example shown, the drive shaft 3 rotates (dead travel θ) to a drive position α2 where the projection 37 comes into contact with the opposite edge of the notch 17 of the control cam 11.

In the remainder of the angular travel, in other words the second part of the path denoted 'γ', the drive shaft 3 rotates the control member 1. More specifically, the drive shaft 3 moves from angular position α2, also called the drive position α2, to angular position α3 at the end of the angular travel, while at the same time the control member 1 moves from angular position β2, also called the locking position β2, to angular position β3, also called the unlocking position β3, thus completely unlocking the locking elements 5.

In the second part of the path, the drive shaft 3 also drives the second control member of the second hinge mechanism 20, from angular position β2' which does not necessarily coincide with angular position α2, β2.

It should be noted that the angular position α1 of the drive shaft and the angular position β2 of the control member are represented with solid lines in FIG. 8, while the angular position β3 of the control member is represented with a dotted line.

In the first portion of the angular travel, the dead travel θ, only the second spring(s) 4 oppose(s) the rotation and the force exerted by the user.

In the second portion of the angular travel, angle γ, the first spring(s) 2 and the second spring(s) 4 oppose the rotation and the force exerted by the user.

Advantageously, the dead travel θ is typically chosen to be between 3° and 10°. In addition, advantageously the angle γ is typically chosen to be between 10° and 30°, depending on the possible embodiments of the inclined surfaces 67 of the control cam 11.

If the (optional) second hinge mechanism 20 is present, for the second portion of the angular travel the first spring(s) 2, the second spring(s) 4, and the third springs oppose the rotation and the force exerted by the user.

For the second hinge mechanism 20, the dead travel θ' between angular position α1 and angular position β2' may be slightly different from the dead travel θ of the first hinge mechanism 10. The dead travel θ' of the second hinge mechanism 20 ensures that, while the drive shaft 3 is being urged toward the rest position α1, the first hinge mechanism 10 and second hinge mechanism 20 are securely locked.

To assemble the drive shaft 3 into the hinge mechanism 10, the connecting rod 9 is inserted into:
the axial recess 63 of the control hub 6,
the central recess 89 of the first plate 81,
the central axial opening 92 of the control plate 12, and the central recess 93 of the control cam 11.

Advantageously, the internal hub 6 is integrated prior to assembly of the first plate 81 and second plate 82 of the hinge mechanism 10.

Next, the external shaft 7 is snap-fitted into place. The fastening tab 72, advantageously having a hook shape, catches on the control hub 6, such that the external shaft 7 is immobilized axially relative to the hinge mechanism 10.

Elastic tabs 75 are clipped into holes 39 of the connecting rod 9 which are provided near the end of the rod 9. An inner shoulder 79 immobilizes the rod 9 in the opposite axial direction. The snap-fitted assembly of the external shaft 7 is thus sufficient to immobilize all the parts axially.

As a result, the entire mechanism can be assembled manually, without tools. There is no need to provide axial immobilization in the second hinge mechanism 20 when the latter is present.

To allow their synchronous control by the handle 95, the control members for the first hinge mechanism 10 and second hinge mechanism 20 are interconnected by the drive shaft 3. One can refer to the description provided to this effect for FIG. 8.

It should be noted that in the example shown, the handle 95 is operated in the clockwise direction, but operating the handle 95 in the opposite direction (counterclockwise) is equally possible.

It should also be noted that there may be fourth springs in the second hinge mechanism 20, similar to the second springs 4, which act on the internal hub of the second hinge mechanism 20. In this case, it should be noted that the first hinge mechanism 10 and second hinge mechanism 20 may be similar in all respects except for the mirror symmetry. Therefore, from a logistics and industrial point of view, only the two references of right and left need to be managed.

The invention is obviously not limited to the embodiments described above, which are provided only as examples. It covers various modifications, alternative forms, and other variants conceivable to those skilled in the art and falling within the scope of the present invention, including all combinations of the various modes of operation described above, separately or in combination.

The invention claimed is:

1. A hinge mechanism for a motor vehicle seat, allowing angular adjustment of a first frame member relative to a second frame member about a main hinge axis, comprising:
   a first hinge plate and second hinge plate, intended to be rigidly connected to the first frame member and the second frame member respectively,
   a control member, able to move locking elements which are adapted to immobilize the first hinge plate rotationally relative to the second hinge plate, and biased to a locking position by at least one first spring, and
   a drive shaft, biased to a rest position by at least one second spring the drive shaft being rigid with a user control handle,
   wherein the second spring is housed between the first hinge plate and second hinge plate and bears against the first hinge plate, and
   wherein the drive shaft is decoupled from the control member and adapted to rotate the control member when a user applies force to the user control handle.

2. The hinge mechanism according to claim 1, wherein the first spring and second spring are arranged substantially at the same position along the hinge axis.

3. The hinge mechanism according to claim 2, comprising at least two first springs, wherein the second spring is arranged circumferentially at a midpoint between two first springs.

4. The hinge mechanism according to claim 3, comprising three first springs and three second springs, wherein each of the second springs is respectively interposed between two of the first springs, wherein each of the first springs and second springs are separated by an angular distance that is substantially near 60°.

5. The hinge mechanism according to claim 1, wherein the locking elements are guided in translation in the radial direction, under the effect of rotation of the control member, by guides.

6. The hinge mechanism according to claim 1, wherein backlash is provided between the rest position of the drive shaft and a drive position of the drive shaft, allowing a dead travel of more than 3°.

7. The hinge mechanism according to claim 1, wherein the drive shaft comprises a connecting rod.

8. The hinge mechanism according to claim 1, wherein the drive shaft comprises an internal hub.

9. The hinge mechanism according to claim 8, wherein the internal hub comprises at least one radial projection which supports the second spring biasing the drive shaft toward the rest position.

10. The hinge mechanism according to claim 8, wherein an external shaft is clipped onto the internal hub.

11. The hinge mechanism according to claim 10, wherein the connecting rod is clipped into the external shaft.

12. The hinge mechanism according to claim 10, wherein the external shaft abuts against an abutment of the first frame member.

13. The hinge mechanism according to claim 1, wherein the control member comprises:
   a control cam adapted to push the locking elements outwardly into a locked position, and
   a control plate comprising at least one ramp adapted to move the locking elements inwardly into an unlocked position.

14. An angular adjustment device for a vehicle seat, comprising a first hinge mechanism according to claim 1, the control member of the first hinge mechanism forming a first control member, the adjustment device further comprising a second hinge mechanism comprising:
   third and fourth hinge plates intended to be rigidly connected to the first and second frame members respectively, and
   a second control member able to move second locking elements which are adapted to immobilize the third hinge plate relative to the fourth hinge plate,
   wherein the drive shaft is adapted to rotate the second control member about the main hinge axis, and
   wherein the second control member is returned to a locking position by at least a third spring, the rest position of the drive shaft being separated from the position where the drive shaft drives the second control member from its locking position by a backlash.

15. A vehicle seat comprising at least one hinge mechanism according to claim 1.

16. A vehicle seat comprising an angular adjustment device having at least one hinge mechanism according to claim 1.

17. The hinge mechanism according to claim 1, further comprising a recess formed in one of the hinge plates and facing toward the other hinge plate, wherein the second spring is housed in the recess.

18. The hinge mechanism according to claim 1, wherein the second spring has an axis different from the hinge axis.

19. The hinge mechanism according to claim 1, wherein the first spring is arranged at substantially the same angular position about the hinge axis as one of the locking elements.

20. The hinge mechanism according to claim 1, wherein the first spring is axially offset from the locking elements to at least partially overlap with one of the locking elements.

* * * * *